(12) United States Patent
Do et al.

(10) Patent No.: US 9,611,149 B2
(45) Date of Patent: Apr. 4, 2017

(54) METHOD AND APPARATUS FOR MODIFYING GRAPHENE

(71) Applicant: HANWHA CHEMICAL CORPORATION, Seoul (KR)

(72) Inventors: Seung Hoe Do, Daejeon (KR); Jin Seo Lee, Yongin (KR); Seong Yun Jeon, Daejeon (KR); Jung Ho Kong, Daejeon (KR)

(73) Assignee: HANWHA CHEMICAL CORPORATION, Seoul (KR)

( * ) Notice: Subject to any disclaimer, the term of this patent is extended or adjusted under 35 U.S.C. 154(b) by 0 days.

(21) Appl. No.: 14/907,862

(22) PCT Filed: Aug. 21, 2014

(86) PCT No.: PCT/KR2014/007785
§ 371 (c)(1),
(2) Date: Jan. 27, 2016

(87) PCT Pub. No.: WO2015/026181
PCT Pub. Date: Feb. 26, 2015

(65) Prior Publication Data
US 2016/0176714 A1    Jun. 23, 2016

(30) Foreign Application Priority Data

Aug. 21, 2013 (KR) .......................... 10-2013-0099288

(51) Int. Cl.
*C01B 31/04* (2006.01)
*B01J 8/02* (2006.01)

(52) U.S. Cl.
CPC ............. *C01B 31/0484* (2013.01); *B01J 8/02* (2013.01); *B01J 2208/00539* (2013.01);
(Continued)

(58) Field of Classification Search
CPC . C01B 31/04; C01B 31/0407; C01B 31/0415; C01B 2204/00; C01B 2204/02;
(Continued)

(56) References Cited

U.S. PATENT DOCUMENTS

2010/0044646 A1    2/2010  Zhamu
2011/0311432 A1    12/2011 Pu
(Continued)

FOREIGN PATENT DOCUMENTS

CN          102515155        6/2012
KR     10-2008-0027258       3/2008
(Continued)

OTHER PUBLICATIONS

Praxair, Safety Precautions for Carbon Dioxide, p. 1-39 (Oct. 15, 2009).*
(Continued)

*Primary Examiner* — Daniel C McCracken
(74) *Attorney, Agent, or Firm* — Lex IP Meister, PLLC

(57) ABSTRACT

There are a method and an apparatus for modifying a graphene, and more specifically, a method and an apparatus for modifying a graphene capable of obtaining the graphene having a desired crystallite size by repeating a process for modifying the graphene using subcritical or supercritical carbon dioxide several times. According to the method and the apparatus for modifying the graphene of the present invention, the graphene having excellent electrical conductivity and dispersibility may be obtained.

7 Claims, 3 Drawing Sheets

(52) U.S. Cl.
CPC ..... *B01J 2208/024* (2013.01); *C01B 2204/22* (2013.01); *C01B 2204/32* (2013.01); *Y02P 20/544* (2015.11)

(58) Field of Classification Search
CPC ............ C01B 2204/04; C01B 2204/06; C01B 2204/065; C01B 2204/20; C01B 2204/22; C01B 2204/24; C01B 2204/28; C01B 2204/30; C01B 2204/32
USPC .......................................................... 423/448
See application file for complete search history.

(56) References Cited

U.S. PATENT DOCUMENTS

2012/0298289 A1* 11/2012 Jiang ................... C01B 31/0469 156/155
2013/0108540 A1   5/2013 Baek

FOREIGN PATENT DOCUMENTS

| KR | 10-2009-0103614 | 10/2009 |
|---|---|---|
| KR | 10-2009-0124051 | 12/2009 |
| KR | 10-2010-0036572 | 4/2010 |
| KR | 10-1254173 | 4/2013 |
| KR | 10-2013-0050048 | 5/2013 |

OTHER PUBLICATIONS

Search Report & Written Opinion, Patent Cooperation Treaty, Application No. PCT/KR2014/007785, Dec. 2, 2014.
Nen-Wen Pu et al., "Production of few-layer graphene by supercritical CO2 exfoliation of graphite", Materials Letters, 2009. 6. 22, vol. 63, pp. 1987-1989.
Lihua Li et al., "Solvent-Exfoliated and Functionalized Graphene with Assistance of Supercritical Carbon Dioxide", ACS Sustainable Chem. Eng., 2012. 10. 9, vol. 1, pp. 144-151.
European Patent Office, Extended European Search Report (ESR) of European Patent Application No. 14837488.7, Dec. 12, 2016.
Hyun Seog Sim et all, "preparation of graphene nanosheets through repeated supercritical carbon dioxide process", Material Letters, 89, pp. 343-346, Sep. 3, 2012.

* cited by examiner

METHOD AND APPARATUS FOR MODIFYING GRAPHENE

TECHNICAL FIELD

The present invention relates to a method and an apparatus for modifying a graphene, and more specifically, to a method and an apparatus for modifying a graphene using carbon dioxide.

The application claims the benefit of Korean Patent Application No. 2013-0099288 filed in the Korean Intellectual Property Office on Aug. 21, 2013, the entire contents of which are incorporated herein by reference.

BACKGROUND ART

Graphene is a material in which carbon atoms of graphite which is a three-dimensional structured carbon allotrope naturally present in the natural world are arranged in a hexagonal plane structure which is a two-dimensional sheet form. Carbon atoms of the graphene form a $sp^2$ bond, and have a plane sheet form in a single atom thickness.

The graphene has significantly excellent electric conductivity and thermal conductivity, and physical properties such as excellent mechanical strength, flexibility, elasticity, quantized transparency depending on thickness, high specific surface area, and the like, may be explained by specific bonding structure of atoms present in the graphene. Three of four peripheral electrons of the carbons configuring the graphene form a $sp^2$ hybrid orbital to have a sigma bond, and remaining one electron and the surrounding carbon atoms form a pi bond to provide a hexagonal two-dimensional structure. Therefore, the graphene has a band structure which is different from other carbon allotropes, and does not have a band gap to exhibit excellent electric conductivity; however, the graphene is a semi-metal material in which state density of electrons at the Fermi level is 0, and therefore, may easily change electrical properties depending on whether or not it is doped.

Accordingly, since the graphene may be variously applied to automobile, energy, aerospace, construction, and pharmaceutical fields as well as various electric electronic fields such as next-generation materials, capacitors, electromagnetic shielding materials, sensors, displays, and the like, which are replaceable for silicon electric electronic materials, research into a technology of utilizing the graphene in various fields has been largely conducted.

As a method for preparing the graphene, a scotch-tape method or a peel off method for exfoliating a graphene single layer from the graphite sheet using an adhesive tape, chemical vapor deposition, an epitaxial growth method by lamination on a silicon carbide substrate (SiC), thermal exfoliation of exfoliating the graphite by using heat, chemical reduction, or the like, has been researched.

Among them, the chemical reduction has advantages in that mass-production is possible, economic feasibility is provided, and various functional groups may be easily introduced into the graphene sheet. Meanwhile, in this method, reducing agents such as hydrazine, and the like, should be used for a deoxygenation reaction of graphene oxide, wherein most of these reducing agents are dangerous due to high corrosiveness, explosiveness, human toxicity, and the like, and the prepared graphene may include impurities, and the like, such that electric conductivity may be decreased. In addition, there is a possibility that each layer of the graphene after the reduction process is performed may be recombined, and it is difficult to control a size of the graphene, such that desired function of the graphene may not be effectively exerted.

Therefore, research into a method for modifying a graphene capable of obtaining the graphene having a desired crystallite size, even by more economical and low-risk processes, should be conducted.

SUMMARY OF INVENTION

Technical Problem

The present invention has been made in an effort to provide a method and an apparatus for modifying a graphene capable of obtaining the graphene having a desired crystallite size, even by economical and low-risk processes, using carbon dioxide.

Solution to Problem

An exemplary embodiment of the present invention provides a method for modifying a graphene including: injecting carbon dioxide in a liquid state into a reactor having the graphene; modifying the graphene by temperature-raising and pressure-raising carbon dioxide to 20 to 50° C. and 73 to 200 atm, respectively; pressure-releasing and cooling the modified graphene; and recovering the pressure-released graphene by a recovering bath filled with deionized water.

In addition, another exemplary embodiment of the present invention provides an apparatus for modifying a graphene including: a first modification reactor performing a first modification reaction of the graphene using carbon dioxide at a temperature of 20 to 50° C. and a pressure of 73 to 200 atm; a carbon dioxide feeding pump feeding carbon dioxide into the first modification reactor; a raw material injection apparatus injecting the graphene into the first modification reactor; a first pressure-releaser connected to a rear end of the first modification reactor; and a recovering bath connected to a rear end of the first pressure-releaser and recovering the graphene in a state in which deionized water is filled into the recovering bath.

Advantageous Effects of Invention

According to a method and an apparatus for modifying a graphene of the present invention, a process for modifying the graphene using carbon dioxide at specific pressure and temperature range is repeated several times, and the modified graphene is recovered by a recovering bath filled with deionized water, such that the graphene having a desired crystallite size may be obtained, and the carbon dioxide used in the reaction may be reused, which is economical, and separate toxic chemicals, and the like, are not used, which is eco-friendly.

DESCRIPTION OF EMBODIMENTS

Figure 1:
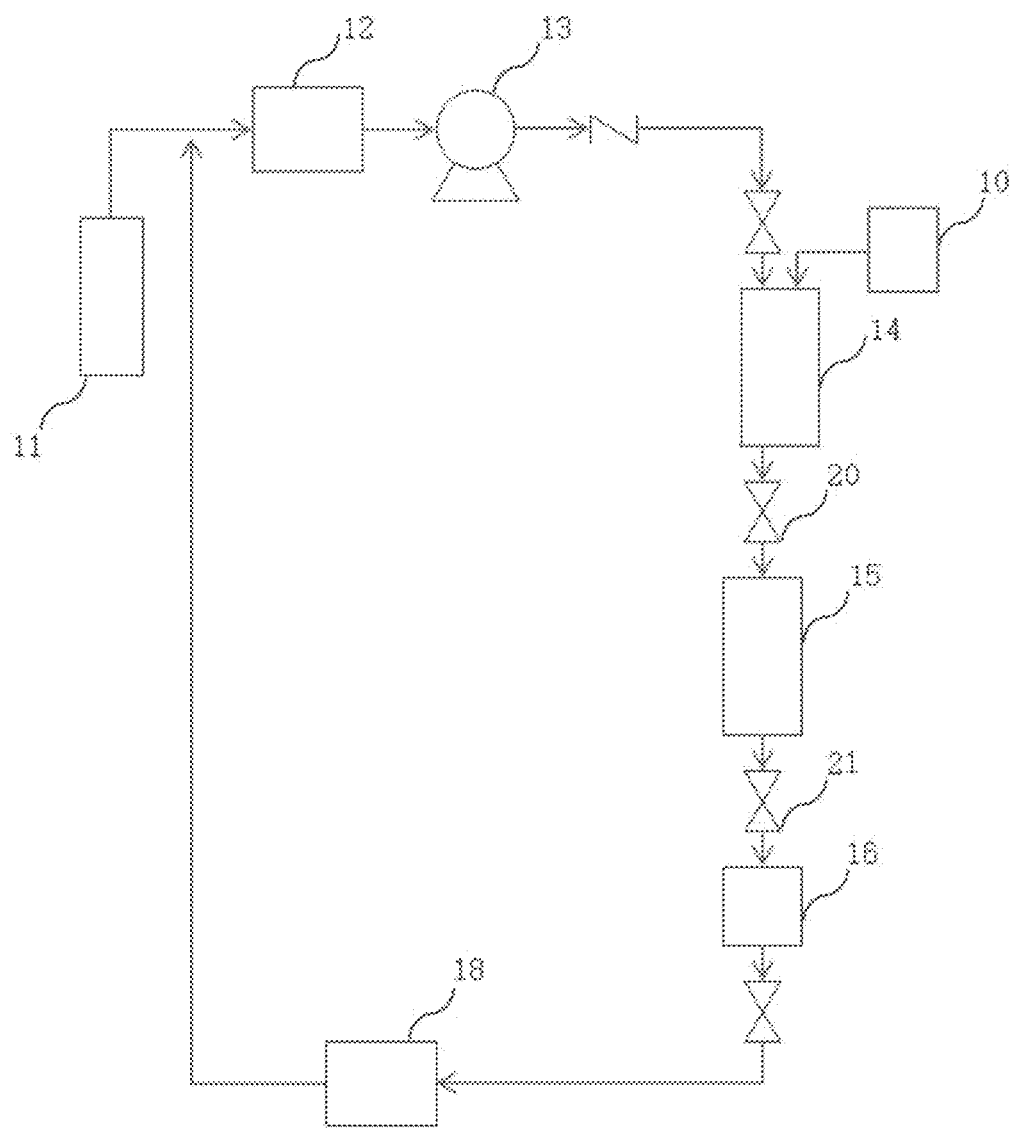
FIG. 1 exemplarily shows an apparatus for modifying a graphene according to an exemplary embodiment of the present invention.

A method for modifying a graphene of the present invention includes injecting carbon dioxide in a liquid state into a reactor having the graphene; modifying the graphene by temperature-raising and pressure-raising carbon dioxide to 20 to 50° C. and 73 to 200 atm, respectively; pressure-releasing and cooling the modified graphene; and recovering the pressure-released graphene by a recovering bath filled with deionized water.

In addition, an apparatus for modifying a graphene includes: a first modification reactor performing a first modification reaction of a graphene using carbon dioxide at a temperature of 20 to 50° C. and a pressure of 73 to 200 atm; a carbon dioxide feeding pump feeding carbon dioxide into the first modification reactor; a raw material injection apparatus injecting the graphene into the first modification reactor; a first pressure-releaser connected to a rear end of the first modification reactor; and a recovering bath connected to a rear end of the first pressure-releaser and recovering the graphene in a state in which deionized water is filled into the recovering bath.

Terms such as first, second, and the like, used herein, are used for explaining various components, and these terms are used to distinguish one component from another component.

The terminology used herein is for the purpose of describing exemplary embodiments only and is not intended to be limiting the present invention. Singular forms are intended to include plural forms as well, unless the context clearly indicates otherwise. It will be further understood that the terms "comprises", "provides" and/or "has," when being used in this specification, specify the presence of stated features, numbers, steps, or components, or combinations thereof, but do not exclude the presence or addition of one or more other features, numbers, steps, components, or combinations thereof.

Although the present invention may be modified variously and have several embodiments, the exemplary embodiments are illustrated in the accompanying drawings and will be described in detail in the detailed description. However, the present invention is not limited to the specific embodiments and should be construed as including all the changes, equivalents, and substitutions included in the spirit and scope of the present invention.

Hereinafter, the present invention will be described in more detail.

The method for modifying the graphene according to an exemplary embodiment of the present invention includes injecting carbon dioxide in a liquid state into a reactor having the graphene; modifying the graphene by temperature-raising and pressure-raising carbon dioxide to 20 to 50° C. and 73 to 200 atm, respectively; pressure-releasing and cooling the modified graphene; and recovering the pressure-released graphene by a recovering bath filled with deionized water.

In addition, according to another exemplary embodiment of the present invention, in the method for modifying the graphene, the process of temperature-raising and pressure-raising the carbon dioxide; and the process of pressure-releasing and cooling the modified graphene may be repeated two times or more. In addition, the method for modifying the graphene may further include a process of recovering the carbon dioxide discharged from the process of pressure-releasing and cooling the modified graphene so that the carbon dioxide is reused. After the recovered carbon dioxide is cooled, the cooled carbon dioxide may be re-fed for a graphene modification reaction, such that an amount of carbon dioxide discharged to the outside of the reactor may be reduced, whereby green-house gases having a large influence on global warming may be reduced.

The modified graphene may be a graphene sheet or a graphene particle. The graphene sheet refers to a sheet-shaped carbon structure formed of a single layered structure separated from the graphite, and the graphene particle means a carbon structure in which the graphene sheets are overlapped and agglomerated with each other.

According to an exemplary embodiment of the present invention, the graphene may be prepared from at least one kind selected from the group consisting of graphene platelet, graphene nanoplatelet, graphene oxide, graphite, graphite oxide, graphite nanoplatelet, expanded graphite, diamond, fullerene, carbon black, activated carbon, charcoal, carbon nanoribbon, carbon nanowire, carbon nanoclay, carbon nanotube, pitch carbon fiber, carbon nanofiber, carbon glass fiber, asphalt, mixtures thereof, and the like.

For example, when the graphene is prepared by using graphite as a precursor, and a chemical reduction method, the graphene may be prepared by the following method.

First, the graphite is treated with a strong acid such as sulfuric acid, nitric acid, hydrochloric acid, or the like, and a peroxide oxidizing agent such as permanganate, dichromate, chlorate, or the like, to obtain a graphite oxide. In the prepared graphite oxide, functional groups such as an epoxy group, a carboxyl group, a carbonyl group, a hydroxyl group, and the like, which are forms that carbon, the main component of the graphite, is oxidized, may be present in the graphite, such that bonding force between the graphene single layers is weaken, whereby the graphite oxide may be easily separated. For example, the graphite oxide is effectively dispersed into a predetermined solvent, such that a mixed solution in which the graphite oxide or the graphene oxide is mixed may be prepared, wherein in order to more improve the dispersion effect in dispersion, dispersion methods using ultrasound, a homogenizer, and the like, may be used.

The graphene oxide obtained by exfoliation from the graphite oxide in the dispersed mixed solution almost loses original property of the graphene, such that a method for reducing the graphene oxide again is required. In general, the graphene oxide may be reduced to the graphene again by treating it with strong reducing agents such as hydrazine, and the like, or by treating it with a supercritical fluid using water or carbon dioxide as a medium.

In the graphene reduced by the above-described method, the number of laminated graphene sheets is remarkably decreased as compared to the graphite which is an original starting material, such that the graphene sheet having a single-layered structure may be prepared; however, a form in which the graphene sheets are overlapped with each other in several layers may still be prepared. In addition, the reduction is not completely achieved in the graphene oxide, such that various kinds of functional groups may still remain on the surface of the graphene.

When the functional groups remain on the surface of the graphene, the functional groups disturbs interaction of a pi bond on the layered structure of the graphene, such that the graphene has increased dispersibility to be easily separated into the single-layered graphene sheet; but physical properties such as electrical conductivity, and the like, of the graphene may be deteriorated. On the contrary, when the functional groups rarely remain on the surface of the graphene, physical properties such as electrical conductivity, and the like, may be excellent; however, the layered structure of the graphene may strongly remain, and dispersibility is decreased, such that it is difficult to be separated into the single-layered graphene sheet.

Therefore, a method for modifying the graphene having a multilayered structure prepared by the above-described method, into a graphene having high dispersibility without deteriorating physical properties such as electrical conductivity, and the like, is required.

According to the method for modifying the graphene of the present invention, the graphene having the multilayered structure prepared by various methods may be treated with carbon dioxide at specific pressure and temperature range to be modified into a graphene having high dispersibility without deteriorating physical properties such as electrical conductivity, and the like, and a size of the graphene crystal particle may be controlled by controlling frequency of treatment with subcritical or supercritical carbon dioxide and treatment process thereof.

The modified graphene may be used in various industrial fields such as barrier materials, lightweight materials, energy, batteries, electronics, electrics, semiconductors, steel, displays, home electronics, mobile phones, nano-industries, biotechnologies, polymer composites, metal composites, paints, pastes, inks, water treatment, wastewater treatment, antistatic materials, electrostatic dispersion materials, conductive materials, electromagnetic wave shielding materials, electromagnetic wave absorbers, radio frequency (RF) absorbers, materials for solar cell, electrode materials for dye-sensitized-solar-cell (DSSC), electrical device materials, electronic device materials, semiconductor device materials, photoelectric device materials, notebook component materials, computer component materials, memory devices, mobile phone component materials, PDA component materials, PSP component materials, component materials for game machine, housing materials, transparent electrode materials, opaque electrode materials, field emission display (FED) materials, back light unit (BLU) materials, liquid crystal display (LCD) materials, plasma display panel (PDP) materials, light emitting diode (LED) materials, touch panel materials, electronic quotation board materials, billboard materials, display materials, heating elements, heat radiating elements, plating materials, catalysts, co-catalysts, oxidizing agents, reducing agents, automobile component materials, ship component materials, aircraft component materials, protective tape materials, adhesive materials, tray materials, clean room materials, transport component materials, flame retardant materials, antibacterial materials, metal composite materials, non-ferrous metal composite materials, materials for medical devices, building materials, flooring materials, materials for wallpaper, light source component materials, lamp materials, optical instrument component materials, materials for fabricating fibers, materials for manufacturing clothing, materials for electric products, materials for manufacturing electronic products, materials for secondary battery including cathode active materials for secondary battery, anode active materials for secondary battery and conductors for secondary battery, fuel cell materials, hydrogen storage material, capacitor materials, and the like.

The apparatus for modifying the graphene according to an exemplary embodiment of the present invention includes: a first modification reactor performing a first modification reaction of a graphene at a temperature of 20 to 50° C. and a pressure of 73 to 200 atm using carbon dioxide; a carbon dioxide feeding pump feeding carbon dioxide into the first modification reactor; a raw material injection apparatus injecting the graphene into the first modification reactor; a first pressure-releaser connected to a rear end of the first modification reactor; and a recovering bath connected to a rear end of the first pressure-releaser and recovering the graphene in a state in which deionized water is filled into the recovering bath.

According to an exemplary embodiment of the present invention, the apparatus for modifying the graphene may further include a second modification reactor connected to a rear end of the first pressure-releaser and performing a second modification reaction of the graphene using carbon dioxide at a temperature of 20 to 50° C. and a pressure of 73 to 200 atm; and a second pressure-releaser connected between a rear end of the second modification reactor and a front end of the recovering bath.

In addition, according to another exemplary embodiment of the present invention, the apparatus for modifying the graphene may further include a carbon dioxide chiller connected to a front end of the carbon dioxide feeding pump and cooling the carbon dioxide to be a liquid state.

Further, according to another exemplary embodiment of the present invention, the apparatus for modifying the graphene may further include a carbon dioxide storing bath connected to a front end of the carbon dioxide chiller, storing the carbon dioxide, and supplying the carbon dioxide into the carbon dioxide chiller.

In addition, according to another exemplary embodiment of the present invention, the apparatus for modifying the graphene may further include a carbon dioxide circulating chiller connected to a rear end of the recovering bath and cooling the carbon dioxide discharged from the recovering bath so that the carbon dioxide is reused.

FIG. 1 exemplarily shows the apparatus for modifying the graphene according to an exemplary embodiment of the present invention.

Referring to FIG. 1, the apparatus for modifying the graphene according to an exemplary embodiment of the present invention may include a carbon dioxide storing bath 11 storing the carbon dioxide which is carbon dioxide for the reaction, a carbon dioxide chiller 12 cooling the carbon dioxide to be a liquid state, a carbon dioxide feeding pump 13 feeding carbon dioxide into the first modification reactor 14, a raw material injection apparatus 10 injecting the graphene into the first modification reactor 14, a first modification reactor 14 performing the first modification reaction of the graphene using the carbon dioxide, a first pressure-releaser 20 connected to a rear end of the first modification reactor 14, a second modification reactor 15 connected to a rear end of the first pressure-releaser 20 and performing the second modification reaction of the graphene using the carbon dioxide, a second pressure-releaser 21 connected to a rear end of the second modification reactor 15, a recovering bath 16 connected to a rear end of the second pressure-releaser 21 and recovering the graphene, and a carbon dioxide circulating chiller 18 cooling the carbon dioxide used in the modification reaction so that the carbon dioxide is reused.

Hereinafter, the method and the apparatus for modifying the graphene will be described in more detail.

First, the graphene as a raw material for the modification reaction is injected from the raw material injection apparatus 10 into the first modification reactor 14. Here, the injection method is not specifically limited, and any commercially available graphene may be injected without limitation.

According to an exemplary embodiment of the present invention, the graphene may be prepared from at least one kind selected from the group consisting of graphene platelet, graphene nanoplatelet, graphene oxide, graphite, graphite oxide, graphite nanoplatelet, expanded graphite, diamond, fullerene, carbon black, activated carbon, charcoal, carbon nanoribbon, carbon nanowire, carbon nanoclay, carbon nanotube, pitch carbon fiber, carbon nanofiber, carbon glass fiber, asphalt, mixtures thereof, and the like.

In addition, carbon dioxide is separately fed from the carbon dioxide feeding pump 13 into the first modification reactor 14 in a liquid state.

The carbon dioxide may be stored in the carbon dioxide storing bath 11 and cooled to be a liquid state while passing through the carbon dioxide chiller 12, and may be injected in a liquid state into the first modification reactor 14 by the carbon dioxide feeding pump 13.

A temperature and a pressure of the first modification reactor 14 are raised so that the carbon dioxide reaches a subcritical or supercritical state while controlling pressure of the injected carbon dioxide. Here, the temperature may be 20 to 50° C., and the pressure may be 73 to 200 atm, preferably, may be about 35 to about 50° C. and about 80 to about 200 atm. Each of the temperature and pressure conditions may be appropriately controlled so that the carbon dioxide is maintained to have the subcritical or supercritical state. When the reaction is performed under condition lower than the above-described range of temperature and pressure, the graphene may not be effectively modified, and when the reaction is performed under condition higher than the above-described range of temperature and pressure, economic feasibility may be deteriorated due to the cost for maintaining high temperature and high pressure condition, and the surface of the modified graphene may be damaged.

The carbon dioxide having the subcritical fluid state or the supercritical fluid state in the first modification reactor 14 may be permeated into the layered structure of the graphene, such that the graphene may be exfoliated. By the above-described process, the graphene may be modified into a graphene having excellent dispersibility as well as excellent physical properties such as electrical conductivity, and the like.

The first modification reaction modifying the graphene under the subcritical or supercritical condition in the first modification reactor 14 is performed, and a process of pressure-releasing and cooling the modified graphene in the first pressure-releaser 20 connected to the rear end of the first modification reactor 14 is then performed. The graphene obtained by the pressure-releasing and cooling process may have improved dispersibility.

The modification reaction may be performed in the presence of surfactant. As the surfactant, any surfactant such as non-ionic surfactant, cationic surfactant, anionic surfactant, or the like, may be used as long as it is easily dissolvable in carbon dioxide in a liquid phase, and specific examples of the surfactant may include polyoxyalkylene alkylarylether-based surfactant, alkoxylated fluorine-based surfactant, phosphoric acid fluorine-based surfactant, and the like. By performing the modification reaction in the presence of the surfactant, the carbon dioxide may be more easily permeated into the layered structure of the graphene, such that the graphene may have more improved dispersibility.

The graphene obtained after performing the modification reaction in the first and second modification reactors 14 and 15 and the process of pressure-releasing in the first and second pressure-releasers 20 and 21 may be delivered to the recovering bath 16, and the modified graphene may be recovered in the recovering bath 16.

The modified graphene may be delivered from the first pressure-releaser to the recovering bath 16 filled with deionized water. When the modified graphene is recovered by the recovering bath filled with deionized water, layer separation may be effectively achieved as compared to the case of recovering a general graphene in a solid phase, such that single-layered graphene having a smaller crystallite size may be obtained. In addition, when the graphene is recovered in a state in which surfactant such as alkyl benzene sulfonic acid salt aqueous solution, or the like, is filled in the recovering bath, impurities such as metal ions, and the like, may be included; however, when using the deionized water, the impurities may not be included, such that high purity graphene may be obtained.

In the graphene modified by the above-described processes, specific surface area is increased about 1.5 to about 5 times, apparent density is decreased about 10 to 50%, and an expansion rate is about 1.5 to 5 times as compared to the graphene injected before the reaction is performed, such that dispersibility is excellent.

Temperature of the pressure-releasing and cooling process may be about 20 to about 30° C. In addition, pressure of the pressure-releasing and cooling process may be about 1 to about 10 atm, and preferably, about 1 to about 5 atm. When the pressure-releasing and cooling process is performed under a condition lower than the above-described range of temperature and pressure, it is not appropriate for a re-pressurizing process and a temperature-raising process which may be subsequently performed, and when the pressure-releasing and cooling process is performed under a condition higher than the above-described range of temperature and pressure, the pressure-releasing and cooling process is not sufficiently performed, such that it is difficult to recover the graphene later.

In addition, when the modification reaction and the frequency of the pressure-releasing process are changed, the graphene and the carbon dioxide pressure-released in the first pressure-releaser 20 may be delivered to the second modification reactor 15 connected to the rear end of the first pressure-releaser 20. The graphene and the carbon dioxide may be subjected to the second modification reaction in the second modification reactor 15 by temperature-raising and pressure-raising them under the subcritical or supercritical state again. After the second modification reaction modifying the graphene under the subcritical or supercritical condition in the second modification reactor 15 is performed, and a process of press-releasing and cooling the modified graphene in the second pressure-releaser 21 connected to the rear end of the second modification reactor 15 is then performed. The temperature and the pressure in the cooling and pressure-releaseing process in the second pressure-releaser 21 may be controlled to be the same range as the first pressure-reactor 20.

Although FIG. 1 merely shows two modification reactors and pressure-releasers, respectively, the present invention is not limited thereto, and the process of modifying the graphene under the subcritical or supercritical condition and the pressure-releasing and cooling of the modified graphene as explained above may be repeated two times or more, for example, 2 to 30 times, or 2 to 20 times, or 2 to 10 times. By repeating the process of modifying the graphene under the subcritical or supercritical condition and the pressure-releasing and cooling of the modified graphene two times or more, the graphene having excellent electrical conductivity and dispersibility may be obtained. The graphene obtained by repeating the modification reaction and the pressure-releasing process may have more improved electrical conductivity and dispersibility. However, when the number of repetition is increased to be a predetermined level or more, a graphene modification effect obtainable by excessive repetition is not significant, rather, economic feasibility may be deteriorated, and therefore, the number of repetition may be determined in consideration of degree of improving the modification effect and economic feasibility.

Therefore, the apparatus for modifying the graphene may further include additional modification reactor and pressure-releaser at the rear end of the second modification reactor 15 depending on purposes.

Figure 3:
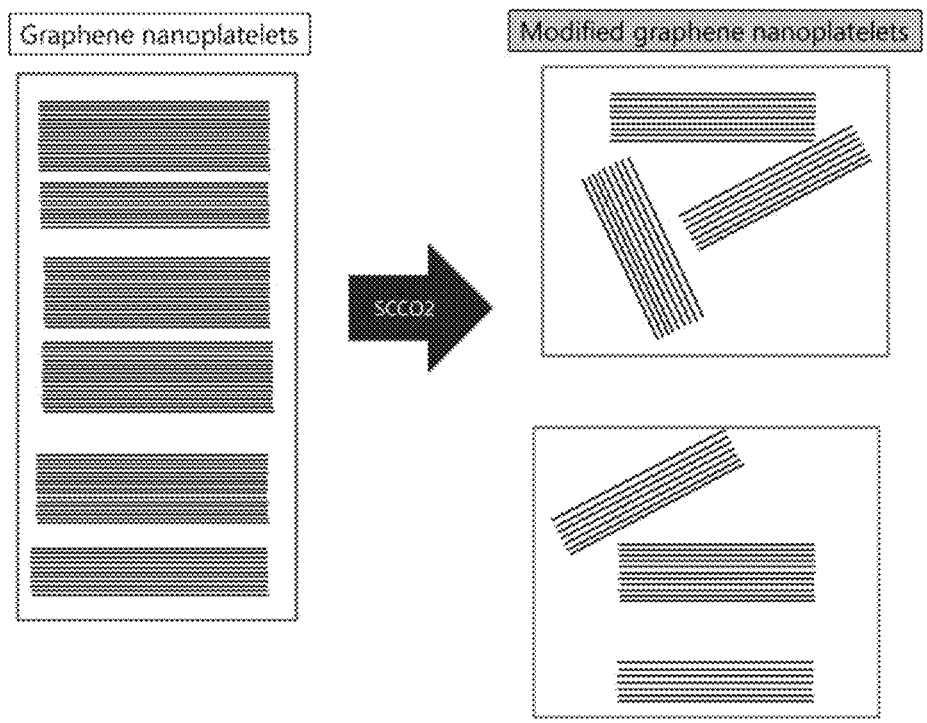
FIG. 3 is a schematic diagram simply showing a state in which the graphene is modified according to an exemplary embodiment of the present invention.

FIG. 3 is a schematic diagram simply showing a state in which the graphene is modified according to an exemplary embodiment of the present invention.

Referring to FIG. 3, it may be simply appreciated that the graphene is exfoliated by the modification process using the subcritical or supercritical carbon dioxide, such that specific surface area is increased, apparent density is decreased, and expansion rate is increased.

The carbon dioxide discharged from the pressure-releasing and cooling process may be recovered so as to be re-injected for the graphene modification reaction. The recovered carbon dioxide may be primarily cooled through the carbon dioxide chiller 18, secondarily cooled through the carbon dioxide chiller 12 again, and re-injected in a liquid state into the first modification reactor 14 by the carbon dioxide feeding pump 13. By the above-described process, an amount of the carbon dioxide discharged to the outside of the reactor may be reduced, such that green-house gases having a large influence on global warming may be reduced.

Hereinafter, functions and effects of the present invention will be described in more detail by specific examples of the present invention. Meanwhile, the Examples are provided only to illustrate the present invention, and the scope of the invention is not limited thereto.

EXAMPLE

Modification of Graphene

Example 1

3.5 g of graphene nanoplatelet and 0.35 g of surfactant (non-ionic surfactant, polyoxyethylene alkylarylether) were mixed and injected into the first modification reactor. Then, a valve of the carbon dioxide storing bath was opened so that carbon dioxide cooled and liquefied by the carbon dioxide chiller was injected by the carbon dioxide feeding pump. The carbon dioxide was injected in a liquid state into the first modification reactor in a compressed state of about 80 to 90 atm, and reacted for about 1 hour under condition in which the first modification reactor had a temperature of 35° C. After reaction, a valve of the first pressure-releaser was opened, and the modified graphene was obtained by the recovering bath filled with deionized water.

Example 2

The same process as Example 1 was performed except that the surfactant was not injected, to obtain a modified graphene in Example 2.

Example 3

The same process as Example 1 was performed except that the reaction temperature was 50° C., to obtain a modified graphene in Example 3.

Example 4

The same process as Example 3 was performed except that the surfactant was not injected, to obtain a modified graphene in Example 4.

Example 5

The same process as Example 4 was performed except that the reaction and the pressure-releasing process were repeated two times, to obtain a modified graphene in Example 5.

Example 6

The same process as Example 4 was performed except that the reaction and the pressure-releasing process were repeated five times, to obtain a modified graphene in Example 6.

Example 7

The same process as Example 4 was performed except that the reaction and the pressure-releasing process were repeated ten times, to obtain a modified graphene in Example 7.

Comparative Example 1

Graphene nanoplatelet before modification was prepared and compared with the graphenes modified by Examples above.

Conditions of Examples and Comparative Example were summarized and shown in the following Table 1.

TABLE 1

| | Reaction Temperature [° C.] | Reaction Pressure [atm] | Frequency of Pressure-releasing Process [times] | Surfactant | Note |
|---|---|---|---|---|---|
| Example 1 | 35 | 85 | 1 | Used | Recovered in Liquid Phase |
| Example 2 | 35 | 85 | 1 | Not used | Recovered in Liquid Phase |
| Example 3 | 50 | 85 | 1 | Used | Recovered in Liquid Phase |
| Example 4 | 50 | 85 | 1 | Not used | Recovered in Liquid Phase |
| Example 5 | 50 | 85 | 2 | Not used | Recovered in Liquid Phase |
| Example 6 | 50 | 85 | 5 | Not used | Recovered in Liquid Phase |
| Example 7 | 50 | 85 | 10 | Not used | Recovered in Liquid Phase |
| Comparative Example 1 | Not performed | Not performed | Not performed | Not performed | Recovered in Liquid Phase |

EXPERIMENTAL EXAMPLE

XRD (X-Ray Diffraction) Measurement

Figure 2:
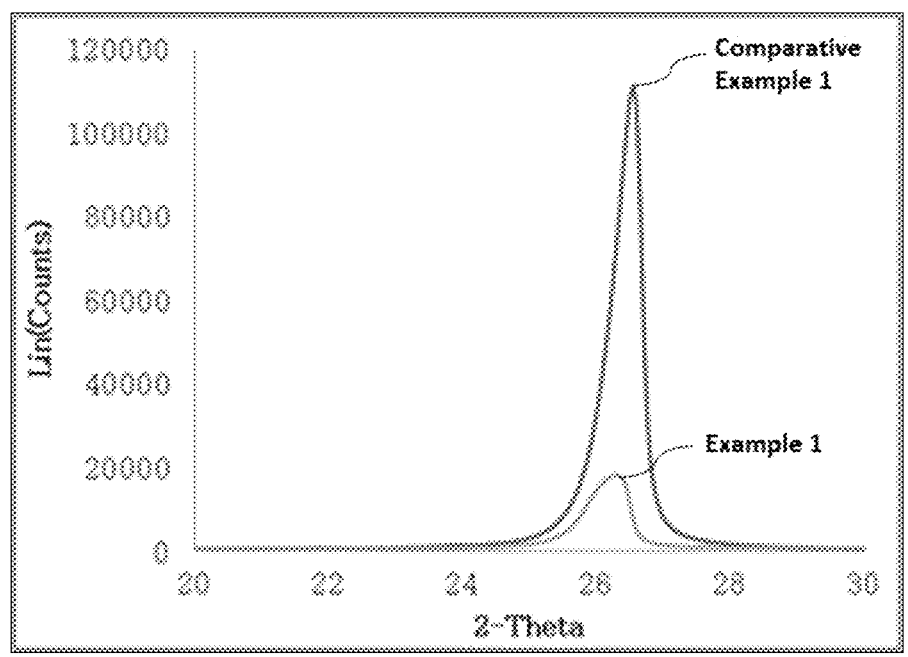
FIG. 2 shows XRD measurement result of graphenes obtained by Example 1 and Comparative Example 1 of the present invention.

XRD was measured by using the graphenes obtained by Example 1 and Comparative Example 1, and results obtained by the measurement were shown in FIG. 2.

Referring to FIG. 2, it could be confirmed that in Examples, a peak observed at 2θ=26° which is a peak of 002 plane shown in the layered structure of the graphite had decreased intensity as compared to Comparative Example. Therefore, it could be appreciated that the layered structure of the graphene was almost separated to be modified into the single-layered graphene.

In addition, it could be appreciated that in Example 1, the crystallite size was decreased by change of full width at half maximum (FWHM) and non-gaussian distribution, and it could be confirmed that the crystal structure was arranged in an irregular form.

Meanwhile, regarding the result obtained by XRD measurement, properties of the crystal was evaluated by Scherrer's equation.

[Scherrer's equation] is as follows.

$$D_p = (0.94\lambda)/\beta \cos \theta$$

In the above equation, $D_p$=average particle size, $\beta$=width at mean height of diffraction peak, $\theta$=angle of diffraction, and $\lambda$=x-ray wavelength, respectively.

Calculation results thereof were shown in the following Table 2.

TABLE 2

|  | 2-theta (°) | Crystallite size [nm] |
|---|---|---|
| Comparative Example 1 | 26.55 | 43.0 |
| Example 1 | 26.29 | 22.6 |

Referring to Table 2, it could be confirmed that in Example, the crystallite size of the graphene was substantially smaller than that of Comparative Example. In particular, in view of the crystallite size, it could be confirmed that Example 1 had a crystallite size of 22.6 nm, which is largely decreased as compared to 43.0 nm of Comparative Example.

SEM, TEM Observation

Figure 4:
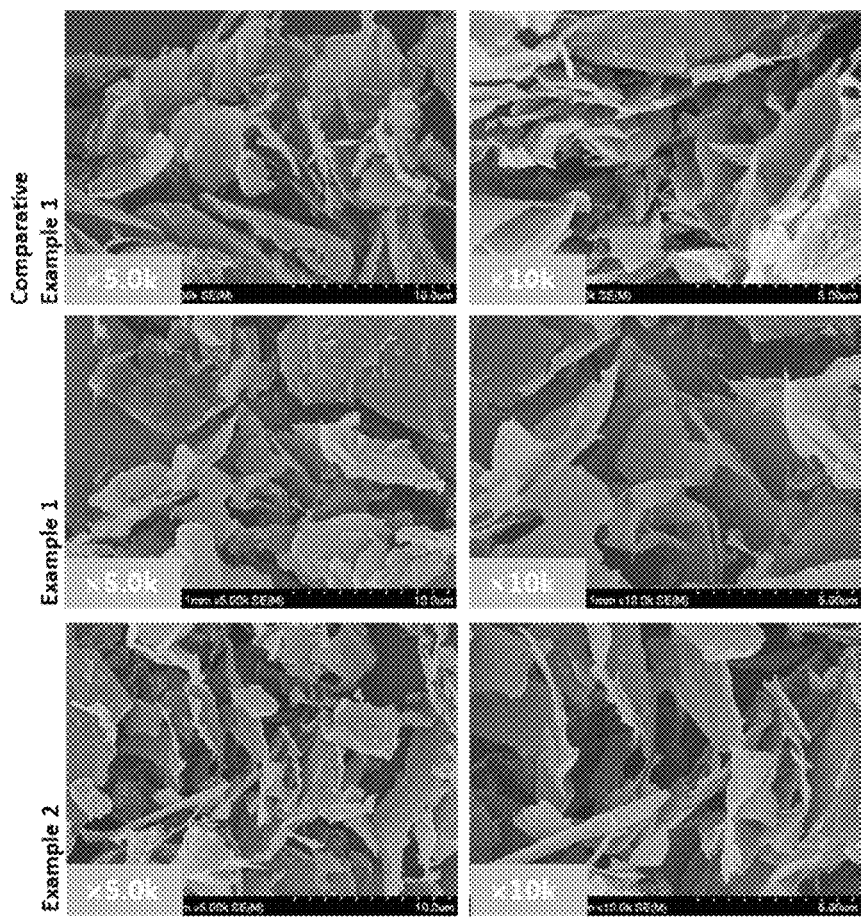
FIG. 4 shows scanning electron microscope (SEM) images of graphenes obtained by Examples 1 and 2 and Comparative Example 1 of the present invention.
Figure 5:
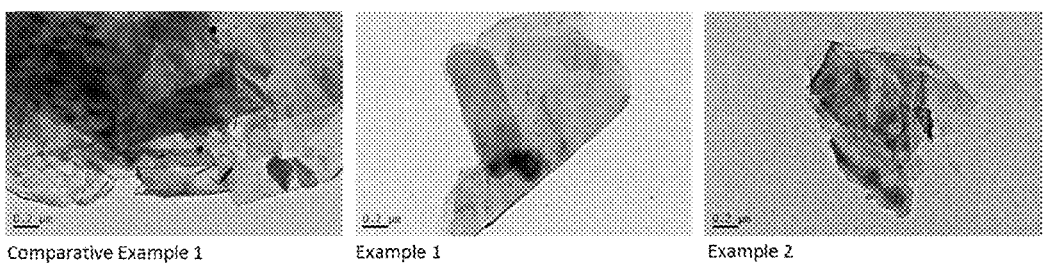
FIG. 5 shows transmission electron microscope (TEM) images of graphenes obtained by Examples 1 and 2 and Comparative Example 1 of the present invention.

SEM images on the graphenes obtained by Examples 1 and 2, and Comparative Example 1 were taken and shown in FIG. 4, and TEM tomography images on the same samples were taken and shown in FIG. 5.

Referring to FIGS. 4 and 5, it could be confirmed that in Comparative Example 1, the graphenes in several layers were overlapped with each other.

Meanwhile, it could be confirmed that in Examples 1 and 2, the crystallite size was decreased as compared to that of Comparative Example 1, and particularly, in Example 1, the number of overlapped layers was slightly decreased due to the surfactant.

Apparent Density Confirmation

Apparent density of the graphenes obtained by Examples 1 to 7 and Comparative Example 1 was measured. Each sample was dried in vacuum oven at 50° C. for 24 hours, and 1 g of each sample was taken and put into a mess cylinder (100 ml), followed by tapping 100 times by a tap density meter, and apparent density of each sample was measured.

Results obtained by the measurement were shown in Table 3.

TABLE 3

|  | Apparent Density [g/ml] | Expansion Rate [times] |
|---|---|---|
| Comparative Example 1 | 0.083 | 1.0 |
| Example 1 | 0.018 | 4.61 |
| Example 2 | 0.020 | 4.15 |
| Example 3 | 0.018 | 4.61 |
| Example 4 | 0.019 | 4.39 |
| Example 5 | 0.017 | 4.88 |
| Example 6 | 0.018 | 4.61 |
| Example 7 | 0.020 | 4.00 |

Referring to Table 3 above, it could be appreciated that in Examples performing the modification reaction, apparent density was significantly decreased as compared to that of Comparative Example 1, and when converting into an expansion rate, the expansion rate of Examples was increased about 4 to 5 times, and particularly, in Example 1 using the surfactant, and in Example 5 in which the modification reaction was repeated two times, the expansion rate was more increased.

Electrical Conductivity Measurement

Electrical conductivity of the graphenes obtained by Examples 2 to 6, and Comparative Example 1 was measured.

Each sample was prepared as a powder state dried at 50° C. for 24 hours by a vacuum oven, then pressure of 12 kN was applied, and electrical conductivity was measured by four terminal method. In the measurement, condition in which temperature was about 5 to about 40° C. and humidity was 50% or less was maintained.

Results obtained by the measurement were shown in Table 4.

TABLE 4

|  | Electrical Conductivity [S/cm] |
|---|---|
| Comparative Example 1 | 403 |
| Example 2 | 685 |
| Example 4 | 603 |
| Example 5 | 624 |
| Example 6 | 620 |

Referring to Table 4, it could be confirmed that in Examples conducted by the modification reaction, electrical conductivity was substantially excellent more than that of Comparative Example, and particularly, by repeating the reaction and the pressure-releasing process, the electrical conductivity was slightly increased.

Accordingly, it is thought that the graphene modified by the method for modifying the graphene of the present invention may be widely applied to fields requiring electrical properties.

DESCRIPTION OF REFERENCE NUMERALS

10: RAW MATERIAL INJECTION APPARATUS
11: CARBON DIOXIDE STORING BATH
12: CARBON DIOXIDE CHILLER
13: CARBON DIOXIDE FEEDING PUMP
14: FIRST MODIFICATION REACTOR
15: SECOND MODIFICATION REACTOR
16: RECOVERING BATH
18: CARBON DIOXIDE CIRCULATING CHILLER
20: FIRST PRESSURE-RELEASER
21: SECOND PRESSURE-RELEASER

The invention claimed is:

1. A method for modifying a graphene comprising the steps of:
   injecting carbon dioxide in a liquid state into a reactor having the graphene;
   modifying the graphene by temperature-raising and pressure-raising carbon dioxide to 20 to 50° C. and 73 to 200 atm, respectively;
   pressure-releasing and cooling the modified graphene; and
   recovering the pressure-released graphene by a recovering bath filled with deionized water.
   wherein the steps of temperature-raising and pressure-raising of the carbon dioxide, and pressure-releasing and cooling of the modified graphene are repeated at least two times.

2. The method of claim 1, wherein the graphene is prepared from at least one kind selected from the group consisting of graphene platelet, graphene nanoplatelet, graphene oxide, graphite, graphite oxide, graphite nanoplatelet, expanded graphite, diamond, fullerene, carbon black, activated carbon, charcoal, carbon nanoribbon, carbon nanowire, carbon nanoclay, carbon nanotube, pitch carbon fiber, carbon nanofiber, carbon glass fiber, and asphalt.

3. The method of claim 1, wherein the temperature-raising and pressure-raising of the carbon dioxide is performed in the presence of surfactant.

4. The method of claim 1, wherein the pressure-releasing and cooling of the modified graphene has a temperature of 20 to 30° C.

5. The method of claim 1, wherein the pressure-releasing and cooling of the modified graphene has a pressure of 1 to 10 atm.

6. The method of claim 1, further comprising a step of recovering a discharged carbon dioxide from the step of pressure-releasing and cooling the modified graphene.

7. An apparatus for modifying a graphene comprising:
   a first modification reactor performing a modification reaction of the graphene;
   a carbon dioxide feeding pump feeding carbon dioxide into the first modification reactor;
   a raw material injection apparatus injecting the graphene into the first modification reactor;
   a first pressure-releaser connected to a rear end of the first modification reactor; and
   a recovering bath connected to a rear end of the first pressure-releaser and recovering the graphene in a state in which deionized water is filled into the recovering bath.

* * * * *